United States Patent [19]
Takada

[11] Patent Number: 4,730,905
[45] Date of Patent: Mar. 15, 1988

[54] EYEPIECE HAVING A RADIAL GRADIENT INDEX LENS

[75] Inventor: Katsuhiro Takada, Tokyo, Japan

[73] Assignee: Olympus Optical Co., Ltd., Tokyo, Japan

[21] Appl. No.: 893,082

[22] Filed: Aug. 4, 1986

[30] Foreign Application Priority Data

Aug. 6, 1985 [JP] Japan ................................ 60-171841

[51] Int. Cl.$^4$ ..................... G02B 25/00; G02B 9/06; G02B 9/12
[52] U.S. Cl. ................................ 350/410; 350/413; 350/477; 350/480
[58] Field of Search ................ 350/413, 410, 477, 480

[56] References Cited
U.S. PATENT DOCUMENTS
4,215,914 8/1980 Muchel et al. ...................... 350/413

FOREIGN PATENT DOCUMENTS
60-220305 11/1985 Japan .................................. 350/413

OTHER PUBLICATIONS
Gradient-Index Eyepiece Design, Forer et al.–Feb. 1, 1983, vol. 22, No. 3/Applied Optics–pp. 407–412.

Primary Examiner—John K. Corbin
Assistant Examiner—Scott J. Sugarman
Attorney, Agent, or Firm—Cushman, Darby & Cushman

[57] ABSTRACT

An eyepiece comprising at least one graded refractive index (GRIN) lens formed that the refractive index thereof is graded according to the radial distance from the optical axis, the eyepiece being arranged to comprise a small number of lenses and to have a long eye relief about 0.8 time of the focal length and an angle of view of 45° or more and arranged that aberrations thereof, especially astigmatism and distortion, are corrected satisfactorily favorably.

6 Claims, 6 Drawing Figures

EYEPIECE HAVING A RADIAL GRADIENT INDEX LENS

BACKGROUND OF THE INVENTION (a) Field of the Invention

The present invention relates to an eyepiece and, more particularly, to an eyepiece comprising a graded refractive index lens (hereinafter referred to as a GRIN lens).

(b) Description of the Prior Art

Generally, eyepieces should be arranged that aberrations thereof are corrected favourably and, at the same time, the eye relief thereof is long. This is because, if the eye relief is short, it is inconvenient, for example, for a person who wears spectacles because he cannot put his eye to the position of the eye point. Besides, if spherical aberration of the image of the exit pupil of the objective, i.e., so-called spherical aberration of the pupil, is not corrected satisfactorily favourably, the field will be partially eclipsed at the time of observation. If curvature of field is large, the quality of image will become unfavourable toward the marginal portion of the field, and the image will become blurred.

For an eyepiece, it is difficult to make the eye relief long and, at the same time, to correct said aberrations favorably. To solve the above-mentioned problem, it is necessary to make the lens diameters large or to arrange that the lens system is composed of a large number of lenses. As a result, the cost of production becomes high and the lens system becomes very large. For correction of curvature of field, it is often arranged to correct aberrations of an eyepiece in combination with an objective instead of correcting aberrations of an eyepiece itself independently or to make the meridional image surface and sagittal image surface symmetrical with each other by arranging that one of them becomes positive and the other becomes negative so as to thereby make the apparent image surface flat.

Generally, it is known to use an aspherical lens or GRIN lens in addition to spherical homogeneous lenses as an element constituting a lens system so as to thereby increase the aberration correcting capacity. However, there exist only few known examples of eyepieces in which an aspherical lens or GRIN lens is used, for example, the eyepiece shown on pages 407 through 412 in No. 3, Volume 22 of Applied Optics issued on Feb. 1, 1983.

The eyepiece shown in the above-mentioned paper comprises a GRIN lens formed that the refractive index thereof is graded in the direction of the optical axis.

As described so far, most of known eyepieces are composed of homogeneous lenses only and most of them are arranged to comprise a large number of lenses. Therefore, it is difficult to assemble them and the cost of production is high. Moreover, when it is attempted to satisfactorily favourably correct curvature of field of an eyepiece itself independently, the number of lenses constituting the lens system becomes still larger and the lens diameters also become still larger. Besides, it is very difficult to ensure the eye relief about 0.8 time of the focal length which is the practically useful eye relief.

In case of the afore-mentioned known eyepiece comprising a GRIN lens formed that the refractive index thereof is graded in the direction of the optical axis, curvature of field and astigmatism are large, the eye relief is not satisfactorily long and, therefore, they cause problems in practical use.

SUMMARY OF THE INVENTION

It is, therefore, a primary object of the present invention to provide an eyepiece comprising a small number of lenses, having a satisfactorily long eye relief (about 0.8 time of the focal length) and an angle of view of 45° or more and arranged that aberrations thereof, especially astigmatism and distortion, are corrected satisfactorily favourably.

The eyepiece according to the present invention is arranged to comprise, in order to attain said object of the present invention, at least one graded refractive index (GRIN) lens formed that the refractive index thereof is graded according to the radial distance from the optical axis.

To obtain an eyepiece having a satisfactorily long eye relief and a large angle of view and, at the same time, arranged that aberrations thereof are corrected favourably, it is necessary to make the lens diameters large or the number of lenses constituting the lens system large.

When the eye relief of an eyepiece is represented by reference symbol L and the angle of view thereof is represented by reference symbol $\omega$, the height of ray on the surface thereof which is the closest to the eye point becomes about $L \tan (\omega/2)$. On the other hand, an eyepiece is required to have an eye relief about 20 mm and an angle of view of 45° or more so as to arrange that it is not inconvenient for observation even for a person who wears spectacles.

To fulfill the above-mentioned requirement, the height of ray on the surface closest to the eye point becomes as follows.

$$20 \times \tan (45°/2) = 8.3 \text{ mm}$$

Therefore, to make the lens system small in size, an eyepiece should be arranged to comprise, in the order from the eye point side, a first lens component having positive refractive power and a second lens component located in rear of the first lens component and, moreover, should be arranged that the first lens component has strong refractive power so that the height of ray does not become too high after passing the first lens component. As a result, the ray is strongly refracted by the first lens component and aberrations become unfavourable. To prevent the above, it is necessary to increase the number of lenses constituting the lens system or to make refractive indices of lenses high. However, for favourable correction of curvature of field, it is not preferable to make positive refractive power strong as above.

On the other hand, as a means for increasing the aberration correcting capacity, it may be considered to use an aspherical lens or GRIN lens in addition to the means to increase the number of lenses constituting the lens system. Especially, a GRIN lens has a feature that rays advance being curved in the medium thereof because the refractive index is graded in the medium.

Generally, aberrations are caused when rays are curved or refracted, but aberrations to be caused as a whole become smaller when rays are gradually curved in the medium compared with the case that rays are strongly refracted at a refractive surface.

In case of a GRIN lens formed that the refractive index thereof is graded in the direction of the optical axis, the medium thereof has almost no refractive power and, therefore, such GRIN lens has only a control capacity for refraction of rays to be obtained chiefly by control of refraction of rays at a refractive surface by means of a gradient of refracitve power of said refractive surface. However, in case of a GRIN lens formed that the refractive index thereof is graded in the radial direction, the medium thereof has refractive power and, therefore, it is possible to prevent aberrations from occurring by maintaining the refractive power of the lens as a whole in the same degree. Besides, it is known from the aberration theory that a GRIN lens, which is formed that the refractive index thereof is graded in the radial direction, causes smaller influence on curvature of field compared with a refractive surface which has the same degree of refractive power. Therefore, when a GRIN lens formed that the refractive index thereof is graded in the radial direction is used, it is easier to correct other aberrations by keeping carvature of field in the favourable state.

The eyepiece according to the present invention is arranged that the first lens component thereof comprises at least one GRIN lens, which is formed that the refractive index thereof is graded in the radial direction, so as to thereby make aberrations to be caused by the first lens component small, said eyepiece being thereby arranged to have a long eye relief and a wide angle of view in spite of the fact that the number of lenses constituting the lens system is small and, at the same time, arranged that aberrations are corrected favourably.

The eyepiece according to the present invention is arranged to have a lens configuration which has small influence on curvature of field and, moreover, arranged that the first lens component thereof comprises a meniscus lens, which has a surface having strong negative refractive power when seen from the eye point side, so as to thereby correct curvature of field and that the height of ray is prevented from becoming too high and aberrations are corrected favourably by the use of a GRIN lens which is formed that the refractive index thereof is graded in the radial direction, the eyepiece according to the present invention being thereby arranged to have a long eye relief and a wide angle of view in spite of the fact that the lens diameters thereof are small and, at the same time, arranged that aberrations, especially curvature of field, are corrected favourably by eyepiece itself.

Besides, when the eyepiece according to the present invention is arranged that the second lens component thereof also comprises a GRIN lens, it is more advantageous for favourable correction of spherical aberration of the pupil which remains uncorrected by the first lens component.

The GRIN lens to be used in the eyepiece according to the present invention described so far is arranged that the gradient of refractive index thereof is expressed by the following formula when the refractive index in the central portion of said GRIN lens is represented by reference symbol $n_0$ and the radial distance from the optical axis is represented by reference symbol r:

$$n = n_0 + n_1 r^2 + n_2 r^4 + \ldots$$

where, reference symbols $n_1$, $n_2$, ... respectively represent coefficients of the second order, fourth order, etc. of the gradient of refractive index.

With the gradient of refractive index expressed by the formula shown in the above, it is preferable to arrange that the coefficient $n_1$ fulfills the following condition:

$$|n_1| > 1 \times 10^{-3}/f^2$$

where, reference symbol f represents the focal length of the lens system.

The condition shown in the above relates to the degree of the gradient of refractive index of the GRIN lens to be used. If said condition is not fulfilled, it is impossible to obtain a sufficient gradient of refractive index for correction of aberrations.

DETAILED DESCRIPTION OF THE PREFERRED EMBODIMENTS

Now, preferred embodiments of the eyepiece according to the present invention described so far are shown below.

EMBODIMENT 1

$f = 1.0, \beta = 10 \mathrm{X}$
$EP = 0.843, \omega = 47.162°$ $r_1 = -3.1233$
$d_1 = 0.2208$  $n_{01} = 1.67$ (*)
$r_2 = -0.8203$
$d_2 = 0.3035$
$r_3 = 1.7509$
$d_3 = 0.3455$  $n_{02} = 1.617$ (*)
$r_4 = -10.5513$
(coefficients of GRIN lens)

| | $n_1$ | $n_2$ |
|---|---|---|
| 1st lens component | $-0.50216 \times 10^{-1}$ | $-0.33426 \times 10^{-1}$ |
| 2nd lens component | $-0.47552 \times 10^{-1}$ | $0.12375$ |

EMBODIMENT 2

$f = 1.0, \beta = 10 \mathrm{X}$
$EP = 0.843, \omega = 45.564°$ $r_1 = -3.1684$
$d_1 = 0.2227$  $n_{01} = 1.66536$ (*)
$r_2 = -0.7685$
$d_2 = 0.4107$
$r_3 = 1.9983$
$d_3 = 0.1471$  $n_{02} = 1.617$
$r_4 = -12.9618$
(coefficients of GRIN lens)

| | $n_1$ | $n_2$ |
|---|---|---|
| 1st lens component | $-0.16282$ | $0.16$ |

EMBODIMENT 3

$f = 1.0, \beta = 10 \mathrm{X}$
$EP = 0.8433, \omega = 46.506°$ $r_1 = -0.3867$
$d_1 = 0.0974$
$r_2 = -0.3949$
$d_2 = 0.1463$  $n_{01} = 1.78472$
$r_3 = -0.4958$
$d_3 = 0.0040$  $n_{02} = 1.62096$ (*)
$r_4 = 1.6099$
$d_4 = 0.0803$  $n_{03} = 1.618$ (*)
$r_5 = 3.7731$
$d_5 = 0.2212$ -continued

| | | |
|---|---|---|
| $r_6 = -35.5531$ | | |
| $d_6 = 0.3807$ | | $n_{04} = 1.62041$ (*) |
| $r_7 = 1.0774$ | | |
| (coefficients of GRIN lens) | | |

| | $n_1$ | $n_2$ |
|---|---|---|
| 2nd lens element of 1st lens component | −1.1250 | −0.45947 |
| 3rd lens element of 1st lens component | −0.79754 | 0.29873 |
| 2nd lens component | −0.95480 | 0.41995 |

In respective embodiments shown in the above, reference symbols $r_1, r_2, \ldots$ respectively represent radii of curvature of respective lens surfaces in the order from the eye point (E) side, reference symbols $d_1, d_2, \ldots$ respectively represent thicknesses of respective lenses and airspaces between respective lenses in the order from the eye point (E) side, reference symbols $n_{01}, n_{02}, \ldots$ respectively represent refractive indices of respective lenses in the order from the eye point (E) side (refractive index on the optical axis in case of a GRIN lens marked with "*"), reference symbol f represents the focal length of the lens system as a whole, reference symbol $\beta$ represents the magnification, reference symbol EP represents the eye relief, and reference symbol $\omega$ represents the angle of view.

Figure 1:
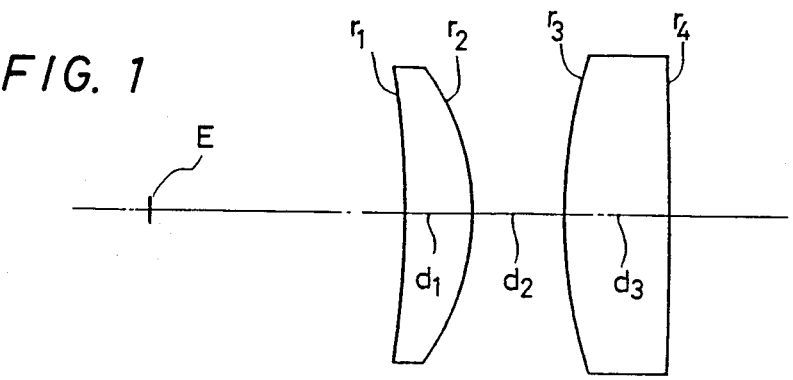
FIGS. 1 through 3 respectively show sectional views of Embodiments 1 through 3 of the eyepiece according to the present invention.

Out of respective embodiments shown in the above, Embodiment 1 has the lens configuration shown in FIG. 1, and both of the first and second lens components are respectively arranged as GRIN lenses.

Figure 2:
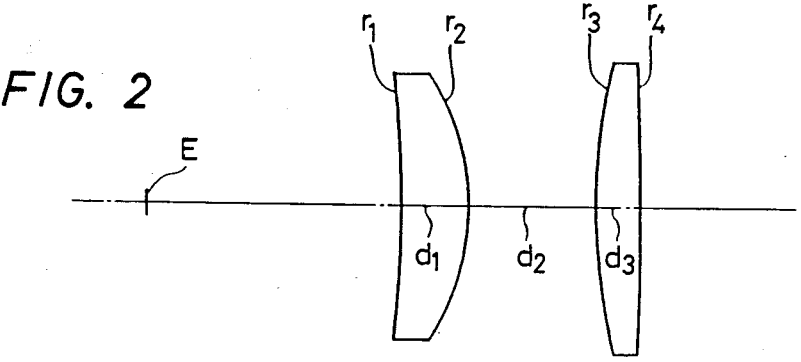

Embodiment 2 has the lens configuration shown in FIG. 2, and only the first lens component is arranged as a GRIN lens.

Figure 3:
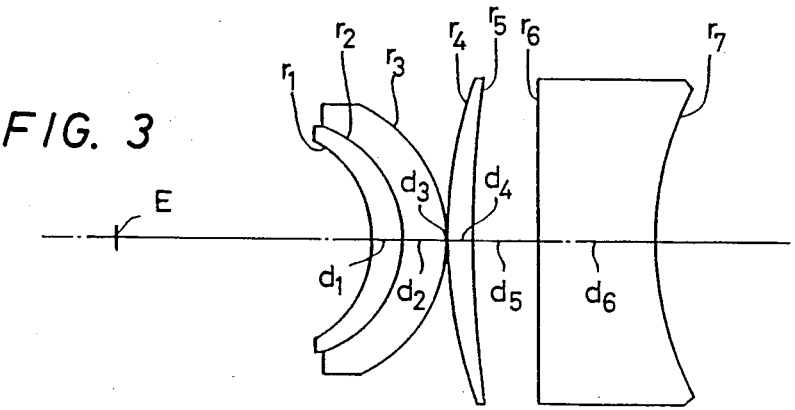

Embodiment 3 has the lens configuration shown in FIG. 3 and is arranged that the first lens component comprises a cemented doublet, which consists of a homogeneous lens (a first lens element) and a GRIN lens (a second lens element), and another GRIN lens (a third lens element), and that the second lens component also comprises a GRIN lens. Out of them, the cemented doublet in the first lens component is arranged as a meniscus lens which is formed by cementing two meniscus lens elements each having a concave surface on the eye point side and which has positive refractive power as a whole.

Figure 4:
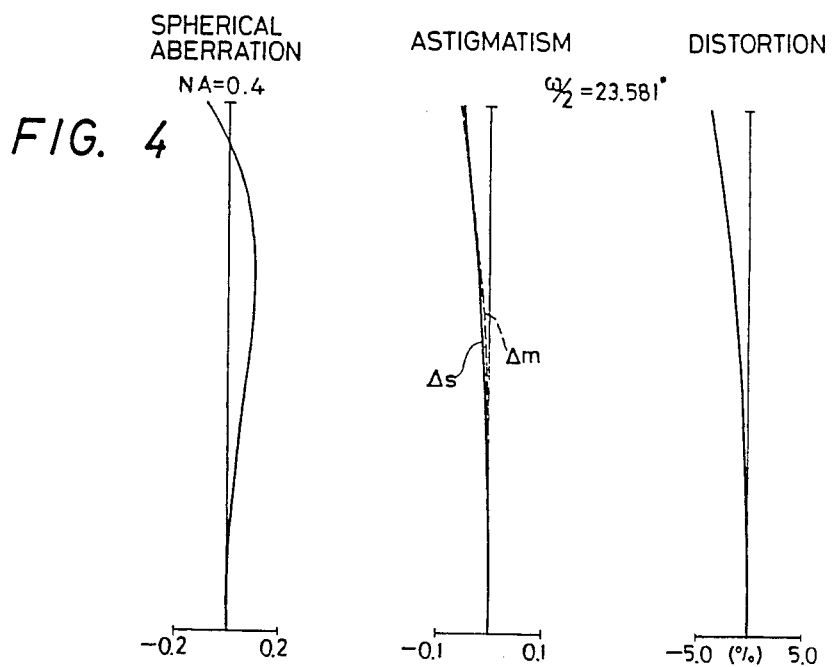
FIGS. 4 through 6 respectively show graphs illustrating aberration curves of Embodiments 1 through 3 of the present invention.
Figure 5:
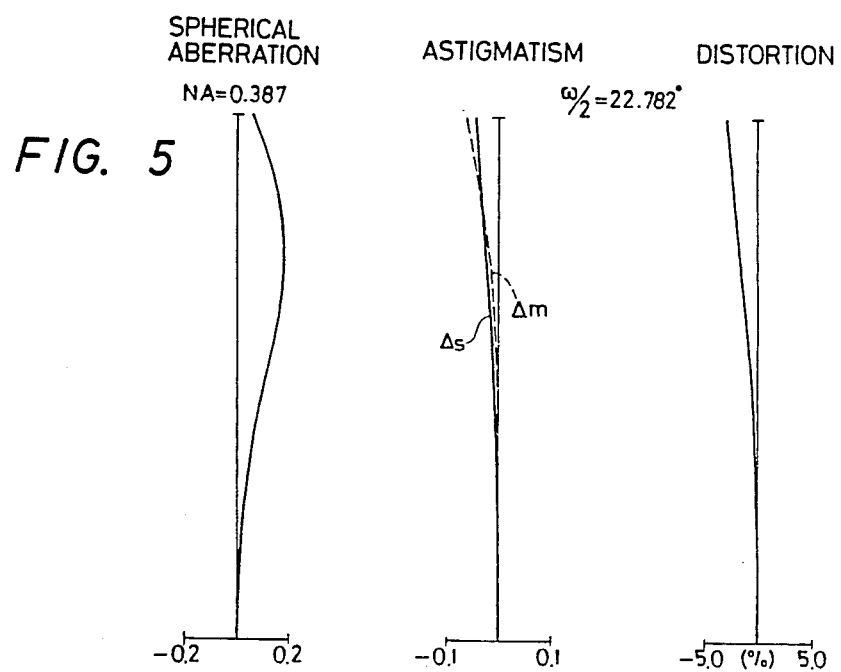

Sectional views of respective embodiments shown in FIGS. 1 through 3 are respectively drawn in the order from the eye point (E) side. Aberration curves of Embodiments 1 through 3 are as illustrated by graphs shown in FIGS. 4 through 6 respectively. Said graphs respectively show aberration curves obtained when rays are traced in the order from the eye point side.

Figure 6:
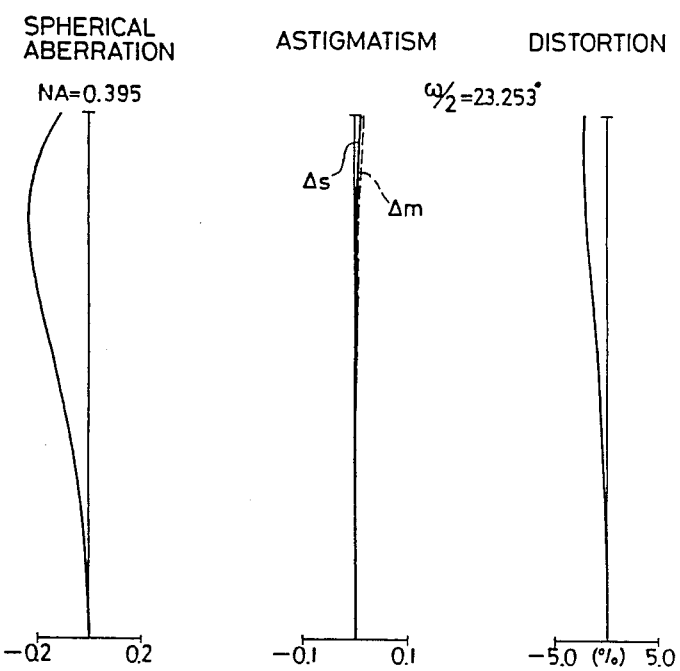

As it is evident from FIG. 6, Embodiment 3 is arranged that curvature of field is corrected especially favourably.

As described in detail so far and as it is evident from respective embodiments, the present invention provides an eyepiece which has an eye relief about 0.8 time of the focal length and an angle of view of 45° or more, in spite of the fact that said eyepiece comprises a small number of lenses, and which is arranged that aberrations are corrected favorably.

I claim:

1. An eyepiece comprising a plurality of lenses, comprising, in the order from the eye point side, a first lens component having positive refractive power which comprises a positive meniscus lens having a concave surface on the eye point side, and a second lens component located in rear of said first lens component, said eyepiece being arranged with said first lens component comprising a graded refractive index lens formed so that the refractive index thereof is graded according to the radial distance from the optical axis.

2. An eyepiece according to claim 1, fulfilling the following condition:

$$|n_1| > 1 \times 10^{-3}/f^2$$

where, reference symbol n represents coefficient of the second order of the gradient of refractive index, and reference symbol f represents the focal length of the lens system.

3. An eyepiece according to claim 2, wherein said first lens component and said second lens component respectively comprise said graded refractive index lenses.

4. An eyepiece according to claim 3, wherein said first lens component is arranged as a positive meniscus lens having a concave surface on the eye point side, and said second lens component is arranged as a positive lens, and wherein said first and second lens components are respectively arranged as said graded refractive index lenses and the refractive indices $n_1$ and $n_2$ of said first and second lens components are represented by the following formulae:

$$n_1 = n_{01} + n_{11}r^2 + n_{21}r^4 + \ldots$$

$$n_2 = n_{02} + n_{12}r^2 + n_{22}r^4 + \ldots,$$

said eyepiece having the following numerical data:

| $f = 1.0$ $\beta = 10 X$ | | |
|---|---|---|
| EP = 0.843 $\omega$ = 47.162° | | |
| $r_1 = -3.1233$ | | |
| $d_1 = 0.2208$ | | $n_{01} = 1.67$ (*) |
| $r_2 = -0.8203$ | | |
| $d_2 = 0.3035$ | | |
| $r_3 = 1.7509$ | | |
| $d_3 = 0.3455$ | | $n_{02} = 1.617$ (*) |
| $r_4 = -10.5513$ | | |
| (coefficients of GRIN lens) | | |

| | $n_1$ | $n_2$ |
|---|---|---|
| 1st lens component | $-0.50216 \times 10^{-1}$ | $-0.33426 \times 10^{-1}$ |
| 2nd lens component | $-0.47552 \times 10^{-1}$ | 0.12375 | where, reference symbols $r_1, r_2, \ldots$ respectively represent radii of curvature of respective lens surfaces in the order from the eye point (E) side, reference symbols $d_1, d_2, \ldots$ respectively represent thicknesses of respective lenses and airspaces between respective lenses in the order from the eye point (E) side, reference symbols $n_{01}$ and $n_{02}$ respectively represent refractive indices of respective lenses in the order from the eye point (E) side (refractive index on the optical axis in case of a GRIN lens marked with "*"), reference symbol f represents the focal length of the lens system as a whole, reference symbol $\beta$ represents the magnification, reference symbol EP represents the eye reliel and reference symbol $\omega$ represents the angle of view.

5. An eyepiece according to claim 2, wherein said first lens component is arranged as a positive meniscus lens having a concave surface on the eye point side, and said second lens component is arranged as a positive lens, and wherein said first lens component is arranged as said graded refractive index lens, and the refractive indices $n_1$ and $n_2$ of said first lens component are represented by the following formulae:

$$n_1 = n_{01} + n_{11}r^2 + n_{21}r^4 + \ldots$$

$$n_2 = n_{02} + n_{12}r^2 + n_{22}r^4 + \ldots$$

said eyepiece having the following numerical data:

| $f = 1.0$ $\beta = 10 \text{ X}$ $EP = 0.843$ $\omega = 45.564°$ | | |
| --- | --- | --- |
| $r_1 = -3.1684$ | | |
| $d_1 = 0.2227$ | | $n_{01} = 1.66536$ (*) |
| $r_2 = -0.7685$ | | |
| $d_2 = 0.4107$ | | |
| $r_3 = 1.9983$ | | |
| $d_3 = 0.1471$ | | $n_{02} = 1.617$ |
| $r_4 = -12.9618$ | | |
| (coefficients of GRIN lens) | | |

| | $n_1$ | $n_2$ |
| --- | --- | --- |
| 1st lens component | $-0.16282$ | $0.16$ | where, reference symbols $r_1$, $r_2$, ... respectively represent radii of curvature of respective lens surfaces in the order from the eye point (E) side, reference symbols $d_1$, $d_2$, ... respectively represent thicknesses of respective lenses and airspaces between respective lenses in the order from the eye point (E) side, reference symbols $n_{01}$ and $n_{02}$ respectively represent refractive indiced of repective lenses in the order from the eye point (E) side (refractive index on the optical axis in case of a GRIN lens marked with "*"), reference symbol f represents the focal length of the lens system as a whole, reference symbol $\beta$ represents the magnification, reference symbol EP represents the eye relief and reference symbol $\omega$ represents the angle of view.

6. An eyepiece according to claim 3, wherein said first lens component consists of a cemented doublet, which consists of a first lens element and a second lens element each having a concave surface on the eye point side and cemented to each other, and a third lens element arranged as a positive lens, and said second lens component is arranged as a biconcave lens, and wherein said second lens element and said third lens element in said first lens component and said second lens component are respectively arranged as said graded refractive index lenses, and the refractive indices $n_1$ and $n_2$ of said second lens element and said third lens element in said first lens component and said second lens component are represented by the following formulae:

$$n_1 = n_{01} + n_{11}r^2 + n_{21}r^4 + \ldots$$

$$n_2 = n_{02} + n_{12}r^2 + n_{22}r^4 + \ldots,$$

said eyepiece having the following numerical data:

| $f = 1.0$ $\beta = 10 \text{ X}$ $EP = 0.8433$ $\omega = 46.506°$ | | |
| --- | --- | --- |
| $r_1 = -0.3867$ | | |
| $d_1 = 0.0974$ | | $n_{01} = 1.78472$ |
| $r_2 = -0.3949$ | | |
| $d_2 = 0.1463$ | | $n_{02} = 1.62096$ (*) |
| $r_3 = -0.4958$ | | |
| $d_3 = 0.0040$ | | |
| $r_4 = 1.6099$ | | |
| $d_4 = 0.0803$ | | $n_{03} = 1.618$ (*) |
| $r_5 = 3.7731$ | | |
| $d_5 = 0.2212$ | | |
| $r_6 = -35.5531$ | | |
| $d_6 = 0.3807$ | | $n_{04} = 1.62041$ (*) |
| $r_7 = 1.0774$ | | |
| (coefficients of GRIN lens) | | |

| | $n_1$ | $n_2$ |
| --- | --- | --- |
| 2nd lens element of 1st lens component | $-1.1250$ | $-0.45947$ |
| 3rd lens element of 1st lens component | $-0.79754$ | $0.29873$ |
| 2nd lens component | $-0.95480$ | $0.41995$ | where, reference symbols $r_1$, $r_2$, ... respectively represent radii of curvature of respective lens surfaces in the order from the eye point (E) side, reference symbols $d_1$, $d_2$, ... respectively represent thicknesses of respective lenses and airspaces between respective lenses in the order from the eye point (E) side, reference symbols $n_{01}$, $n_{02}$, ... respectively represent refractive indices of respective lenses in the order from the eye point (E) side (refractive index on the optical axis in case of a GRIN lens marked with "*"), reference symbol f represents the focal length of the lens system as a whole, reference symbol $\beta$ represents the magnification, reference symbol EP represents the eye relief and reference symbol $\omega$ represents the angle of view.

* * * * *